Nov. 15, 1960   B. L. McGEHEE   2,959,917
SOUND SUPPRESSOR FOR JET ENGINES
Filed April 6, 1959   2 Sheets-Sheet 1

INVENTOR.
BOBBY L. McGEHEE
BY
Duane C. Bowen

INVENTOR.
BOBBY L. McGEHEE

United States Patent Office

2,959,917
Patented Nov. 15, 1960

2,959,917

SOUND SUPPRESSOR FOR JET ENGINES

Bobby L. McGehee, Derby, Kans., assignor to Boeing Airplane Company, Wichita, Kans., a corporation of Delaware Filed Apr. 6, 1959, Ser. No. 804,449

6 Claims. (Cl. 60—35.6)

My invention relates to a sound suppressor for jet engines. Briefly the structure includes an annular suppressor body secured to the exhaust nozzle of a jet engine and having divergent inner wall surfaces. Reduction of sound is effected by exterior air injecting in discrete, sizable streams through openings in the annular body at locations where the interior static pressure is less than the exterior static pressure.

The noise level of jet engines is causing two problems to engine and aircraft manufacturers and their customers: (1) disturbing persons on and near airfields by the noise level, and (2) structurally damaging the aircraft by sonic vibration. The sound in question is the "white" noise caused by the exhaust stream of gas and not the high-pitched noise caused by the compressor. In commercial transports the sound reduction desired is determined by the first condition, e.g., more sound reduction generally is required to maintain a satisfactory sound level around airports than is required to prevent unacceptable structural damage to aircraft. The present invention is primarily directed at the second problem, particularly in military aircraft, where a limited sound reduction is needed, on some engines and especially in take-off conditions, to avoid aircraft damage.

The present invention was made in connection with the production of a military aircraft where some sound suppression was required, with the jet engines used, to prevent damage to structure, particularly to wing trailing edge portions. Tests on the present invention show significant improvements over a three metal-lobe sound suppressor previously installed on the aircraft to meet this problem. The advantages of my suppressor includes: (1) a greater reduction of sound, and (2) a more economical device to manufacture. When incorporated in a production article, it is expected that the present suppressor will be superior and preferable to the three metal-lobe suppressors and other comparable designs. The objectives of my invention include: (1) to devise an improved noise suppressor for jet engines and particularly a construction having a limited amount of sound suppression meeting the requirements in at least some aircraft of preventing structural damage, and (2) to devise a noise suppressor relatively simple and economical to manufacture.

Thrust is penalized by sound suppression in an amount responsive to the amount of noise reduction. Sound suppression and thrust reduction are matters of degree. A compromise must be made between sound suppression and penalties in thrust and weight. Aircraft structure may be increased in strength to accept sonic vibration but a weight penalty is suffered in an amount responsive to the improvement in strength.

Further objectives include devising a sound suppressor which will have a minimum effect on thrust commensurate with the meeting of other objectives; to devise a sound suppressor making a good compromise among noise reduction, thrust reduction and weight penalty, suitable for at least some aircraft; to provide a sound suppressor requiring minimum alterations to existing engines for installation; and to devise a sound suppressor reducing noise by avoiding strong shock waves, by minimizing shearing action between exhaust gas and outside air, and by reducing turburlence at the trailing edge of the suppressor.

My invention will be best understood, together with additional advantages and objectives thereof, from the following description, read with reference to the drawings, in which.

Figures 1, 2:
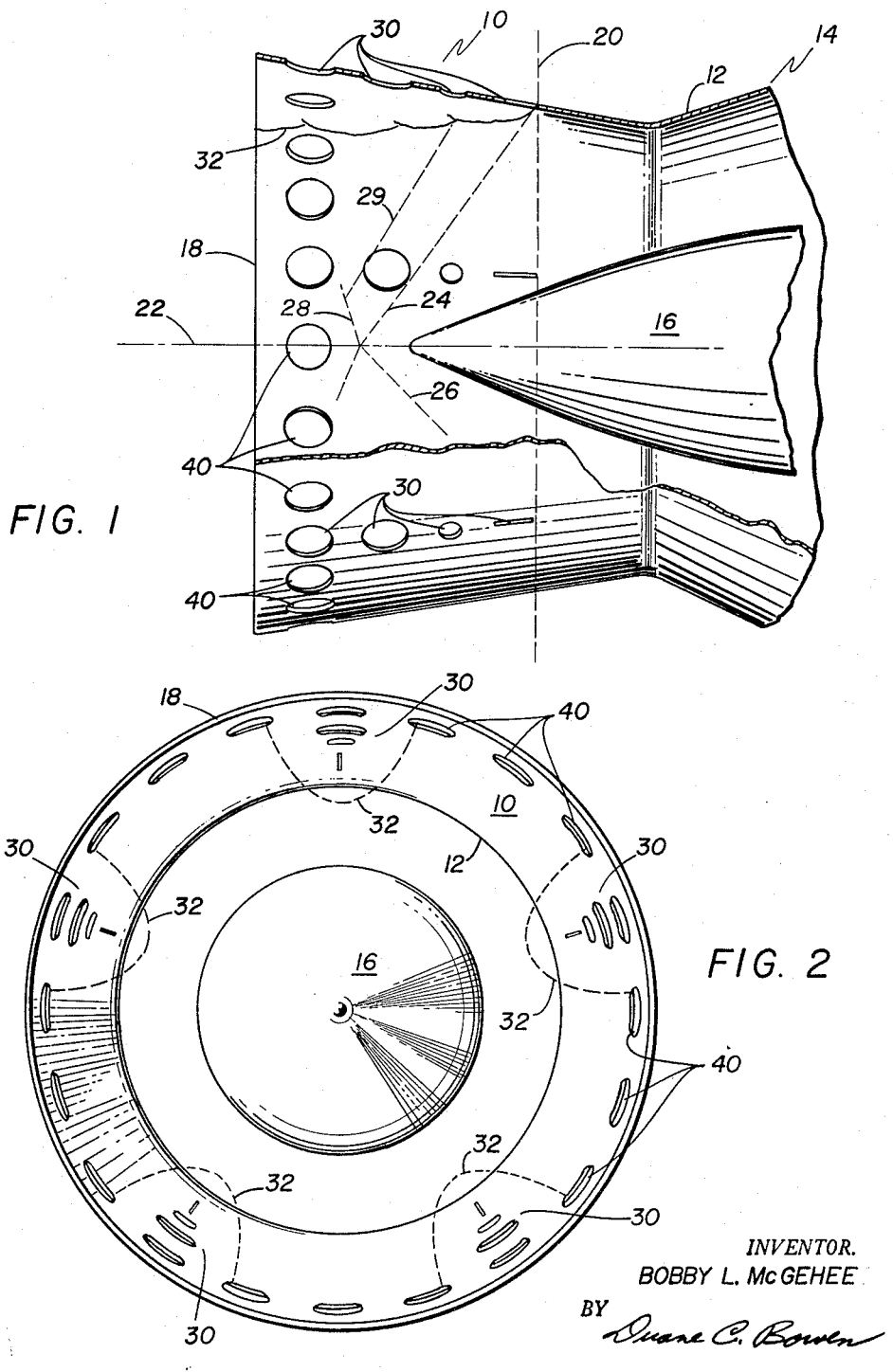
Figure 1 is a side view, principally in section, showing a specific embodiment of my sound suppressor installed on the exhaust nozzle of a jet engine.
Figure 2 is a rear view of the structure shown in Figure 1.

Many engine and aircraft manufacturers are engaged with the problems before recited. The design solutions have differed in sound reduction, in reduction of thrust, in weight penalty, and in complexity of manufacture. Some designs combine sound suppression and thrust reversal mechanisms. Compared to the present design, most of the other sound suppressors are complex, are expensive to manufacture, and have more weight in the suppressor structure. The compromise effected by the present design in sound reduction, thrust reduction and weight penalty factors, is believed to be superior over other suppressors for certain applications.

One problem in sound suppressor design has been incomplete understanding of the phenomena involved in jet engine noise and sound suppression. The present invention was the result of my ideas about sound suppression in view of what was known or suspected about sound suppression. Certain other ideas were developed in the course of the experimental development of the suppressor. These theories will be set forth and will partly explain the phenomena involved in the present suppressor. It is not expected that this will be a complete explanation of the phenomena: much is yet to be learned by those working in the art. However, the explanation is adequate to explain the use and construction of my suppressor in its present form and modifications thereof to meet needs on various engines and aircraft. The results are experimentally verified.

The significant sources of noise in jet nozzles are believed to include: (1) shear between exhaust gas and outside air (larger velocity differentials and larger areas causing more noise), (2) the action of gas passing through shock waves (greater velocity differentials into and out of the shock waves causing greater noise), and (3) a turbulent ring of air and combustion gases formed at the terminal edge of the nozzle. The present suppressor reduces noise from these sources by: (1) minimum shear velocity differentials and areas of larger velocity differentials, (2) reducing the strength of shock waves by substituting a larger number of smaller velocity differential oblique and normal shock waves for a smaller number of greater velocity differential shock waves, and (3) minimizing turbulence at the trailing edge of the suppressor.

The construction of the suppressor shown in the drawings will be first described and then its operation relating to the above objects and discussion will be described. The sound suppressor 10 is attached to the structure 12 that normally is the exhaust nozzle of a jet engine 14.

Nozzle 12 is normally slightly divergent at the trailing edge as to its effective area. Because of the presence of a center cone or spike 16, the expansion or contraction of the nozzle is determined by subtraction of the cone area from what otherwise would be the nozzle area.

In effect, sound suppressor body 10 is a continuation of exhaust nozzle 12 and may be attached to a divergent or convergent nozzle. Although a double-wall suppressor construction could be used if more strength were required or the suppressor could be formed from the same material forming nozzle 12, the suppressor as shown is welded to nozzle 12 and its inner and outer surfaces fair into the corresponding nozzle surfaces. This means that existing turbo-jet engines can be modified by welding annular suppressor bodies 10 to their exhaust nozzles 12.

The proportions of length, diameter and contour of suppressor 10 relative to the sizes of exhaust nozzle 12 and cone 16 are illustrative. The dimensions of the suppressor for any particular installation will be understood by those working in the art from the present description and from other factors in nozzle and suppressor constructions well known in the art. The contour of suppressor body 10 preferably follows the contours known to the art to have the best thrust characteristics in nozzle construction. Most applications at present will be to turbo-jet engines although the suppressor may have application to other engines producing a jet exhaust stream and needing sound suppression as will be understood by those working in the art.

An important feature of the suppressor is that it have sufficient length and diameter at its trailing edge 18 so that the exhaust gas is over-expanded relative to atmospheric pressure. Line 20 is the location where inner and outer static pressures are equal at sea level take-off and it will be seen that suppressor 10 extends substantially beyond that line. The divergent extension of suppressor 10 substantially beyond equal-pressure line 20 is fundamental to the present invention because the exhaust gas becomes over-expanded, e.g., static pressure inside is less than static pressure outside, and outside air will inject through openings in the suppressor wall due to the pressure differential. Preferably the divergent portion of suppressor 10 extends substantially beyond a line where inner and outer static pressures will be equal at cruise altitude. This line will be rearward of sea level equal-pressure line 20 and in the configuration shown would be about at the aft end of the first injection opening. If the divergent portion did not extend aft of the cruise equal-pressure line, this would mean that the exhaust gas would be substantially unsuppressed at cruise altitude and normally it would be preferable to have noise suppression during cruise operation.

The drawings show a particular configuration of such openings. Although the principle of operation of this configuration is highly advantageous, as hereafter will be explained, the provision of sizable, discrete openings between trailing edge 18 and equal-pressure line 20 in other configurations will be advantageous.

The type of openings to which the coverage of the present invention will be limited is "sizable, discrete openings". A perforated structure is meant to be distinguished by this term. However, a problem is raised by this terminology because the terms are somewhat relative. This problem will be resolved by defining the terms by their action on the combustion exhaust gases. "Sizable, discrete openings," for the purpose of this specification and the claims, are defined as openings having sufficient size so that together the air injecting therethrough partly mixes with the exhaust gas and produces oblique shock waves at least part of which interact at the center of the suppressor and exhaust nozzle, as on centerline 22. A "perforated structure" is defined as openings having insufficient size so that together the air injecting therethrough tends to form a boundary layer rather than to substantially mix with the exhaust gas and does not produce oblique shocks which interact at the center of the suppressor.

The critical factor in the definitions is the oblique shocks interacting at the center of the suppressor. The importance of the factor is: (1) such centerline oblique shock interaction is indicative of a sufficient number and magnitude of oblique shocks to minimize the strength of the oblique shocks and the normal shock, thereby reducing noise due to shock waves, and (2) it is indicative of mixing of injecting air and exhaust gas whereby a larger mass of lower-velocity, higher-pressure mixed air and combustion gas is substituted for a smaller mass of higher-velocity, lower-pressure combustion gas, thereby reducing noise due to shear between the exhaust and the outside air.

The interaction of oblique shock waves 24, 26 is illustrated in Figure 1, the interaction producing secondary shock waves 28 which in turn react with a following oblique shock 29. The injecting air mass tends to produce oblique shocks leading from each stream of air injecting through an opening. The oblique shock interaction is much more complex than pictured in Figure 1, the view being in a single plane and only indicating part of the possible interactions even in that plane.

In a conventional, unsuppressed jet engine nozzle with a spike or center cone, the terminal portion of the nozzle usually is at most only slightly divergent. Both oblique and normal shock waves are produced. The velocity into the shocks being relatively high and the difference in entering and leaving velocities being large, the shock waves may be termed "strong." The normal shock wave is closely spaced to the nozzle. One source of noise in such nozzles appears to be the strong shock waves, e.g., the abrupt transistion from a high velocity to a sub-sonic velocity in the case of a normal shock and to a lower but supersonic velocity in the case of an oblique shock wave.

In the present nozzle, "strong" shock waves are largely avoided. The nozzle extends past line 20 where static pressures inside and outside of the nozzle are equal at sea level take-off. If the nozzle instead were terminated at line 20, oblique shock waves would be substantially eliminated and the normal shock would be "weak" and would be spaced a substantial distance aft of the nozzle. However, mere reduction of the strength of shock waves by itself does not sufficiently reduce noise. The high velocity exhausted air would still have a shearing action on outside air producing a high noise level.

In my structure, the suppressor body 10 is extended beyond the equal-pressure line and air is permitted to inject through the openings in the suppressor body. This creates oblique shock waves. As in the case of inlet ducts, if the stream is subjected to more oblique shocks, the normal shock is spaced farther aft and has less strength. Therefore, the oblique shock waves in the present suppressor caused by the injected air serve to space the normal shock farther aft and to make it less severe. Suppressor 10 thus serves to alleviate noise by changing the nature of shock wave formation and the nozzle additionally has other effects on noise to be hereafter related. It should be noted that pressure losses are caused by the exhaust stream passing through shock waves. Greater losses are caused by a smaller number of strong shock waves than by a greater number of weak shock waves. Less pressure loss and better thrust results from the present nozzle as to this factor, as compared with the conventional nozzle.

My suppressor is solid up to take-off equal-pressure line 20. Any openings, perforations or the like up to this point would result in thrust losses and is preferably avoided, each opening in effect being an exhaust nozzle having an axis at an angle to the desired direction of thrust. As far as is known, no sound reduction results of consequence would be achieved by such openings forward of the equal-pressure line.

A series of sizable, discrete openings are provided. Tests have shown improved sound reduction in various configurations of such openings. However, part of these openings preferably are provided in a longitudinal series 30 at a number of locations, i.e., five, around the circumference of the annular suppressor body 10. In suppressor constructions having metal lobes, an odd number of lobes has shown improved experimental results. Each series 30 is preferably formed by a number of openings, although on occastion an elongated slot of comparable area may be substituted. This series of openings preferably stops short of take-off equal-pressure line 20 but all openings may not be aft of the equal-pressure line at cruise altitude.

The provision of the longitudinal series of openings 30 provides an effect comparable to (although different from) the use of inwardly directed, metal-wall lobes serially around the circumference of a nozzle, a feature of some prior suppressors. The injecting air in the present invention tends to concentrate in the areas of said axial series and to build up lobe-like bodies of injected air, as indicated by the reference numeral 32. Oblique shock waves, as 24 and 29, are formed from the "air-lobes" 32 and extend to the center 22 of the nozzle and interact with shock waves, as 26, from opposite lobes. A longitudinal series of such oblique shock waves, as 24, 29, are formed, e.g., at each opening of injected air an oblique shock wave will be formed.

Thus in the preferred form of the invention, part of the openings are concentrated in a longitudinal series 30 at a number of locations thereby achieving the effect of air-lobes 32. These lobes may not be as clearly defined or as stable as those indicated in the drawings. As will be understood, the interaction of shock waves induces turbulence and the injecting air mixes with exhaust gas. Therefore, the air lobes are better understood as locations of injecting air creating oblique shock waves during mixing of injected air and exhaust gas. The injected air adds mass to the combined exhaust stream, increases its pressure, and reduces its velocity.

Other openings are provided in an annular series 40 around suppressor body 10, according to the preferred embodiment of the invention. Additional air is injected through these openings and achieves comparable effects to those described above in connection with openings 30, only to a lesser degree. Series 40 is, of course, located aft of take-off equal-pressure line 20 and preferably is adjacent to trailing edge 18.

The injected air in the present nozzle achieves reduction in shock wave action because the exhaust gas goes through a greater number of oblique shock waves whereby velocity is lower and a weaker normal shock wave is reached at a greater distance aft of the nozzle. If an infinite number of oblique shock waves were passed, pressure loss at each would approach zero and, the velocity being just short of sonic at the normal shock wave, substantially no loss would occur. This would mean that no pressure loss—reduction of thrust—would occur because of the supersonic to sonic transition. In the present nozzle of course an infinite number of oblique shock waves are not present but, to the extent more are present, less pressure loss results than in the case of the prior unsuppressed exhaust nozzles. This also tends to reduce noise due to the shock waves, e.g., more abrupt transitions produce greater noise.

The lobing of the exhaust gas forms a longer line of shear than with an unsuppressed nozzle, immediately aft of the nozzle. The line of shear at a second location farther aft tends to be smaller than with an unsuppressed nozzle, because the lobed areas tend to dissipate. The lobed areas do not have as great a velocity as gases in an unsuppressed nozzle or as gases in the inner exhaust portions of the present suppressor, so these dissipated lobed areas create a relatively small amount of noise.

The openings cause the formation of a boundary of air at the terminal edge 18 of the suppressor thereby reducing turbulence (and a source of noise) at the trailing edge. Metal lobes, on the other hand, increase rather than decrease the turbulent ring.

The statement again should be made that sound suppression is not completely understood and statements of theories of action in the present suppressor are tentative. Later developments in the art may show that additional sound reducing action is present or that some of the statements need modification.

Whatever the theory of the improved suppressor action, good experimental evidence is present that sound suppression is achieved in an amount significant for the purposes above set forth, e.g., reducing fatigue of aircraft structure. In a full-power dry run the following results were obtained:

|   | Decibels |
|---|---|
| (a) Unsuppressed jet engine | 106.5 |
| (b) Three metal-wall lobe sound suppressor on the same engine | 102.5 |
| (c) Sound suppressor similar to that described herein and shown in the drawing | 100.0 |

In a full-power wet (water injection) run the following results were obtained:

|   | Decibels |
|---|---|
| (a) Unsuppressed jet engine | 107.5 |
| (b) Three metal-wall lobe sound suppressor on the same engine | 104.5 |
| (c) Sound suppressor similar to that described herein and shown in the drawing | 104.0 |

The location of the readings was on a line starting seven feet aft of the end of the engine cone and extending rearwardly at an angle of 40° to the engine centerline. The readings were taken at a point twenty-five feet from the angle apex out on this line. The values are uncorrected and, if corrected, would be nearer 140 decibels but the relative values would be similar. Further developments and tests to obtain a production article, which may involve precise numbers, shapes and locations of openings, may result in even greater sound reduction. In the engine and suppressor arts, improvements of configurations may extend over a period of years, but the production article should be at least as advantageous as indicated by the above comparison.

It should be understood that reduction in "noise power," e.g., forces causing fatigue damage, is not proportional to decibel level. In other words, a small decrease in decibel level, relative to the total decibel reading, may result in a large decrease in noise power, e.g., noise producing sonic damage to the aircraft.

Figure 3:
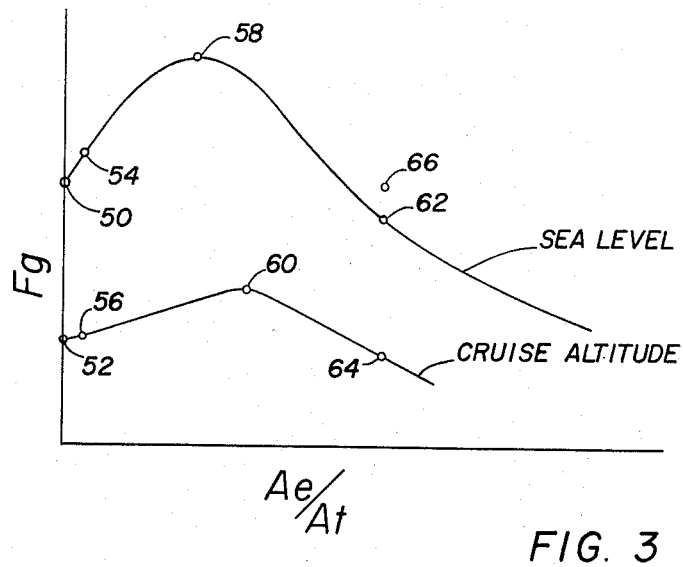
Figure 3 is a graph having thrust on its y axis and having the ratio of suppressor exit area to suppressor throat area on its x axis and showing the effect on thrust of the suppressor of the present invention.

The graph of Figure 3 shows a comparison of thrust of an engine with and without sound suppression. Thrust is displayed on the $y$ axis and the ratio $A_e$ (area of the nozzle or suppressor at the trailing edge) to $A_t$ (area of the nozzle or suppressor at the throat) is shown on the $x$ axis. Numerical values are not given and the curves only show approximate proportions but the illustration is representative. The upper line of the graph is performance at sea level during take off conditions and the lower line in the graph is performance at cruise altitude.

Zero on the $x$ axis is the thrust from a jet engine currently in use, without suppressor, in which the nozzle is only slightly divergent. The sea level thrust 50 is higher than the cruise altitude thrust 52. Reference character 54 is the thrust of the engine at sea level using a suppressor having three metal-wall lobes and reference character 56 shows the results from the same suppressor at cruise altitude. Reference character 58 is the thrust from a nozzle on the engine which terminates on the line where inner and outer static pressures are equal at sea level. Thrust is maximum in such a nozzle. Reference character 60 is the thrust from a nozzle terminating on the line where inner and outer static pressures are equal at cruise altitude. The nozzles would not be the same, e.g., the $A_e/A_t$ ratio (60) is greater for a maximum thrust nozzle at altitude than the ratio (58) for a maximum thrust nozzle at sea level.

The thrust from the suppressor of the present invention at sea level is shown at 62. This is somewhat less than the thrust 50 for an unsuppressed nozzle. The thrust from the suppressor of the present invention at cruise altitude is shown at 64. It is only slightly lower than the unsuppressed nozzle 52. When the present suppressor configuration is maximized, it is quite possible that the thrust at sea level will be further improved, as indicated by reference character 66, so that it will have at least equivalent thrust to that provided at 50 by the unsuppressed nozzle. The graph does not show all factors. The values shown are gross rather than net thrust and are based on nozzle expansion only. For example, there is a thrust loss, not shown, behind the lobes of the three metal-wall lobe suppressor which does not occur in the present suppressor.

The primary purpose of a suppressor is noise reduction and the effect on thrust is only one factor to be taken into consideration, although it is an important factor. The suppressor of the present invention is advantageous because: (1) it achieves a significant amount of noise reduction, as set forth above, sufficient of the limited objective in suppression, and (2) the thrust characteristics are good. The suppression is sufficient to reduce the strength requirement of aircraft structure, whereby the weight penalty to accept sonic vibration is reduced. The structure is economical to manufacture compared with other types of suppressors.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. A sound suppressor on the exhaust nozzle of a jet engine, comprising: an annular suppressor body concentric with and secured to said exhaust nozzle and extending rearwardly therefrom, said annular body having inner wall surfaces forming a continuation of said exhaust nozzle and at least the major portion of said inner wall surfaces including the rear portion being rearwardly divergent, air flow being supersonic in said annular body and said inner wall surfaces at the trailing edge of said annular body having sufficient diameter to over-expand the exhaust gas passing therethrough relative to exterior static pressure in both take-off and cruise engine operation, said body having a series of discrete, sizable through openings disposed therearound and located in an area in said major divergent portion of said annular body between said trailing edge and a line about said body where inner and outer static pressures are equal during take-off, whereby outside air at greater static pressure than on the inside of said openings injects therethrough into said annular body partly mixing with engine exhaust gas and producing oblique shock waves at least part of which interact at the center of said annular body, thereby effecting sound reduction, part of said openings being in an annular series adjacent to said trailing edge and part of said openings being disposed at a series of locations about said body in longitudinally extending series from adjacent to said line to adjacent to said trailing edge whereby injected air tends to concentrate in lobes at said locations of said longitudinally extending series of openings.

2. The subject matter of claim 1 in which said openings in said longitudinally extending series are of increasing size from said line to said trailing edge.

3. A sound suppressor on the exhaust nozzle of a jet engine, comprising: an annular suppressor body concentric with and secured to said exhaust nozzle and extending rearwardly therefrom, said annular body having inner wall surfaces forming a continuation of said exhaust nozzle and at least the major portion of said inner wall surfaces including the rear portion being rearwardly divergent, air flow being supersonic in said annular body and said inner wall surfaces at the trailing edge of said annular body having sufficient diameter to over-expand the exhaust gas passing therethrough relative to exterior static pressure in both take-off and cruise engine operation, said body having a series of discrete, sizable through openings disposed therearound and located in an area in said major divergent portion of said annular body between said trailing edge and a line about said body where inner and outer static pressures are equal during take-off, whereby outside air at greater static pressure than on the inside of said openings injects therethrough into said annular body partly mixing with engine exhaust gas and producing oblique shock waves at least part of which interact at the center of said annular body, thereby effecting sound reduction, at least part of said openings being disposed at a series of locations about said body in longitudinally extending series from adjacent to said line to adjacent to said trailing edge whereby injected air tends to concentrate in lobes at said locations of said longitudinally extending series of openings.

4. The subject matter of claim 3 in which said openings in said longitudinally extending series are of increasing size from said line to said trailing edge.

5. A sound suppressor for an exhaust nozzle of a jet engine, comprising: an annular suppressor body having inner wall surfaces to form a continuation of said exhaust nozzle and at least the major portion of said inner wall surfaces including the rear portion being rearwardly divergent, air flow being supersonic in said annular body and said inner wall surfaces at the trailing edge of said annular body having sufficient diameter to over-expand the exhaust gas passing therethrough relative to exterior static pressure in take-off engine operation, said body having a series of discrete, sizable through openings disposed therearound and located in an area in said major divergent portion of said annular body between said trailing edge and a line about said body where inner and outer static pressures are equal during take-off, whereby outside air at greater static pressure than on the inside of said openings injects therethrough into said annular body partly mixing with engine exhaust gas and producing oblique shock waves at least part of which interact at the center of said annular body, thereby effecting sound reduction.

6. The subject matter of claim 5 in which said annular body is formed of a single sheet of material which is solid except for said openings.

References Cited in the file of this patent

FOREIGN PATENTS

| | | |
|---|---|---|
| 165,369 | Australia | Sept. 26, 1955 |
| 654,344 | Great Britain | June 13, 1951 |